(12) United States Patent
Sardesai et al.

(10) Patent No.: US 12,086,772 B2
(45) Date of Patent: Sep. 10, 2024

(54) SYSTEMS AND METHODS FOR CROSS-CHAIN FEATURE SETS FOR DIGITAL ASSETS

(71) Applicant: Verizon Patent and Licensing Inc., Basking Ridge, NJ (US)

(72) Inventors: Ashish Sardesai, Ashburn, VA (US); Nazneen Khan, Alpharetta, GA (US); Dante J. Pacella, Charles Town, WV (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/816,265

(22) Filed: Jul. 29, 2022

(65) Prior Publication Data

US 2024/0037519 A1 Feb. 1, 2024

(51) Int. Cl.
*G06Q 20/10* (2012.01)
(52) U.S. Cl.
CPC ................... *G06Q 20/10* (2013.01)
(58) Field of Classification Search
CPC ............................. G06A 20/10; G06Q 20/10
See application file for complete search history.

(56) References Cited

FOREIGN PATENT DOCUMENTS

| WO | WO-2022076800 A1 | * | 4/2022 | ......... G06Q 20/3674 |
| WO | WO-2022140454 A1 | * | 6/2022 | |

OTHER PUBLICATIONS

Chainlink Blog, What are Cross-Chain Smart Contracts?, available at https://blog.chain.link/cross-chain-smart-contracts/ (Feb. 8, 2022).

* cited by examiner

*Primary Examiner* — Arunava Chakravarti

(57) ABSTRACT

A system described herein may receive a request to bridge an asset from a first distributed ledger to a second distributed ledger. The system may record, to the first distributed ledger, information indicating that the asset is frozen. The first distributed ledger may maintain information indicating that the frozen asset remains associated with an owner of the asset. The system may record, to the second distributed ledger, a bridged version of the asset, and may link the asset to the bridged asset. The system may identify a transfer of the bridged version of the asset to a second owner, and record, to the first distributed ledger and based on the linking of the asset to the bridged asset, information disassociating the first owner from the asset.

14 Claims, 11 Drawing Sheets

SYSTEMS AND METHODS FOR CROSS-CHAIN FEATURE SETS FOR DIGITAL ASSETS

BACKGROUND

Distributed ledgers, such as blockchains, provide for the decentralized and secure storage of data. Blockchains may further provide for the immutability of recorded data, as data may not be altered once recorded to a blockchain. The immutability of blockchains may thus provide for a secure record of provenance, chain of custody, etc. with data, assets, or the like. One such type of asset may include a non-fungible asset (e.g., a non-fungible token ("NFT")), which may include unique attributes that are not shared by other assets (e.g., other NFTs). Bridges between different blockchains may allow for the provision of assets on one blockchain by locking assets (e.g., fungible assets) on another blockchain.

DETAILED DESCRIPTION OF EXAMPLE EMBODIMENTS

The following detailed description refers to the accompanying drawings. The same reference numbers in different drawings may identify the same or similar elements.

Distributed ledgers, such as blockchains, may maintain records or other information that defines smart contracts, assets (e.g., NFTs), transactions, interactions, and/or other suitable types of information. A distributed ledger may be implemented, maintained, etc. by multiple nodes (e.g., multiple computer systems, servers, cloud devices, or other types of devices) that each maintain a local copy of the distributed ledger, and that communicate with each other (e.g., form a quorum, consensus, etc.) in order to record information to the distributed ledger. The distributed ledger may be immutable, inasmuch as information recorded to the distributed ledger may not be changed, removed, etc. once recorded to the distributed ledger.

Figure 1:
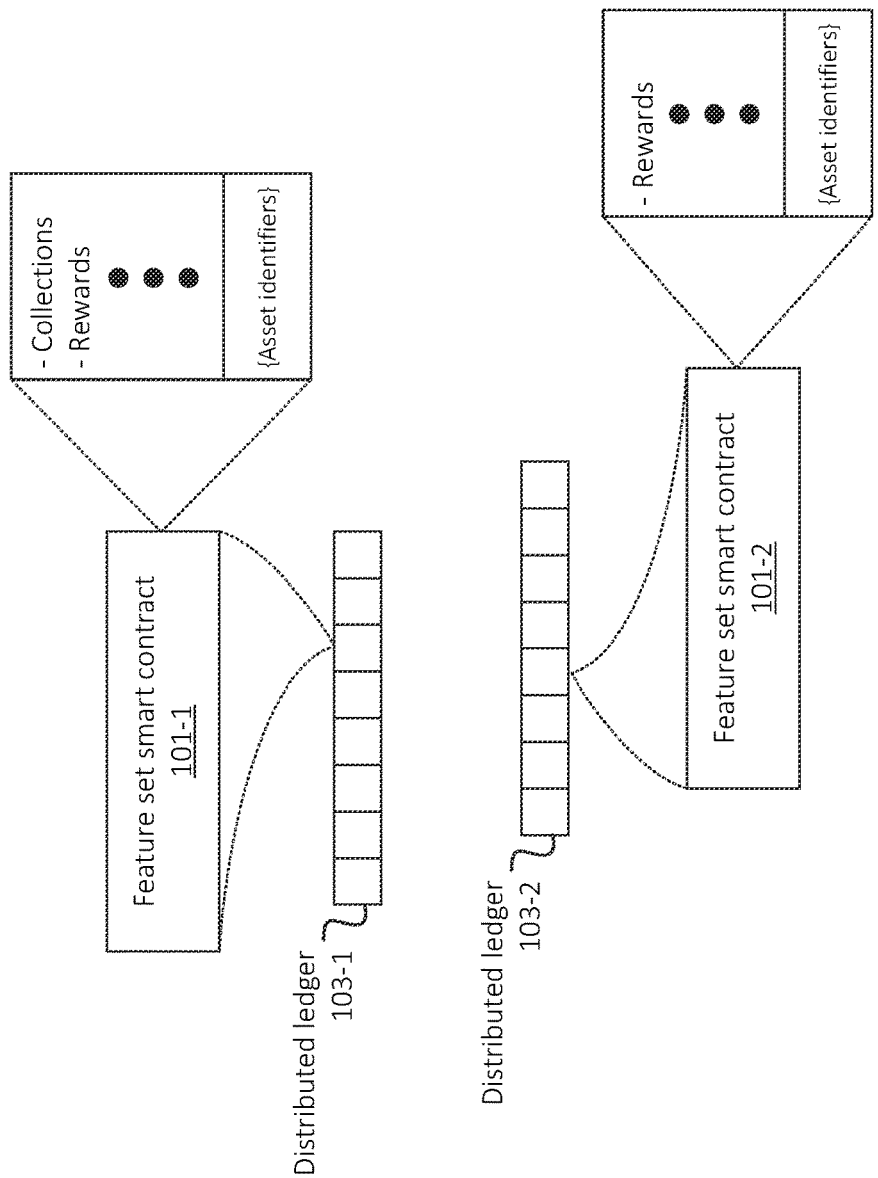
FIGS. 1 and 2 illustrate an example of feature set smart contracts.

Such information may include, for example, records, values, smart contracts, etc. A smart contract maintained on a particular distributed ledger may, for example, specify a set of input parameters and a set of operations to be performed on the input parameters, where the performance of such operations yields a set of output values. One such example of smart contract, as shown in FIG. 1, is a "feature set smart contract," which may generally provide features or functionality to assets defined by one or more records stored to a given distributed ledger (e.g., assets that are "on" the given distributed ledger). For example, feature set smart contract 101-1 may be defined by one or more records stored to a first distributed ledger 103-1 (e.g., feature set smart contract 101-1 may be considered as "being on" distributed ledger 103-1), and feature set smart contract 101-2 may be on distributed ledger 103-2. Each respective feature set smart contract 101 may define a set of operations and a set of assets, where the definition of the operations and the assets provides a user experience of a set of features, enhancements, etc. associated with such assets.

Feature set smart contract 101-1 may include features such as "collections" and "rewards" for particular assets (e.g., as defined by one or more asset identifiers, which may include names or identifiers of particular assets on distributed ledger 103-1, addresses or transaction identifiers associated with the creation or transfer of particular assets on distributed ledger 103-1, etc.), or assets otherwise meeting certain criteria. A "collection" may refer to, for example, a group of assets which, when held by the same owner (e.g., the same address, wallet, etc. associated with distributed ledger 103-1), result in feature set smart contract 101-1 identifying that the owner has possession of the collection. For example, feature set smart contract 101-1 may specify that when the same owner has possession of ten particular assets (e.g., ten assets matching ten asset identifiers specified by feature set smart contract 101-1, and/or ten assets meeting other criteria specified by feature set smart contract 101-1), then that owner is in possession of a "collection" specified by feature set smart contract 101-1. Feature set smart contract 101-1 may further specify one or more operations to perform in the event that a given collection is completed (e.g., a particular set of assets are owned by the same owner), such as providing (e.g., "airdropping") one or more assets to the owner, adding an identifier (e.g., an address, an associated user name, etc.) of the owner to a leaderboard, etc.

As another example, feature set smart contract 101-1 may further specify a "rewards" feature associated with particular assets (e.g., the same assets or different assets associated with the "collections") feature. The "rewards" feature may, for example, provide an owner of a particular asset (or set of assets) with a reward, such as a one-time reward or an ongoing reward (e.g., provided every six hours, every day, every week, every time feature set smart contract 101-1 is invoked or called, etc.). The reward may be provided in the form of, for example, one or more assets on distributed ledger 103-1 or in some other form.

As further shown, a different feature set smart contract 101-2 may be specified on distributed ledger 103-2. Feature set smart contract 101-2 may, for example, include additional, fewer, and/or different features than specified by feature set smart contract 101-1 on distributed ledger 103-1. As such, feature set smart contracts 101-1 and 101-2, on distributed ledgers 103-1 and 103-2, respectively, may be different and completely independent.

Figure 2:
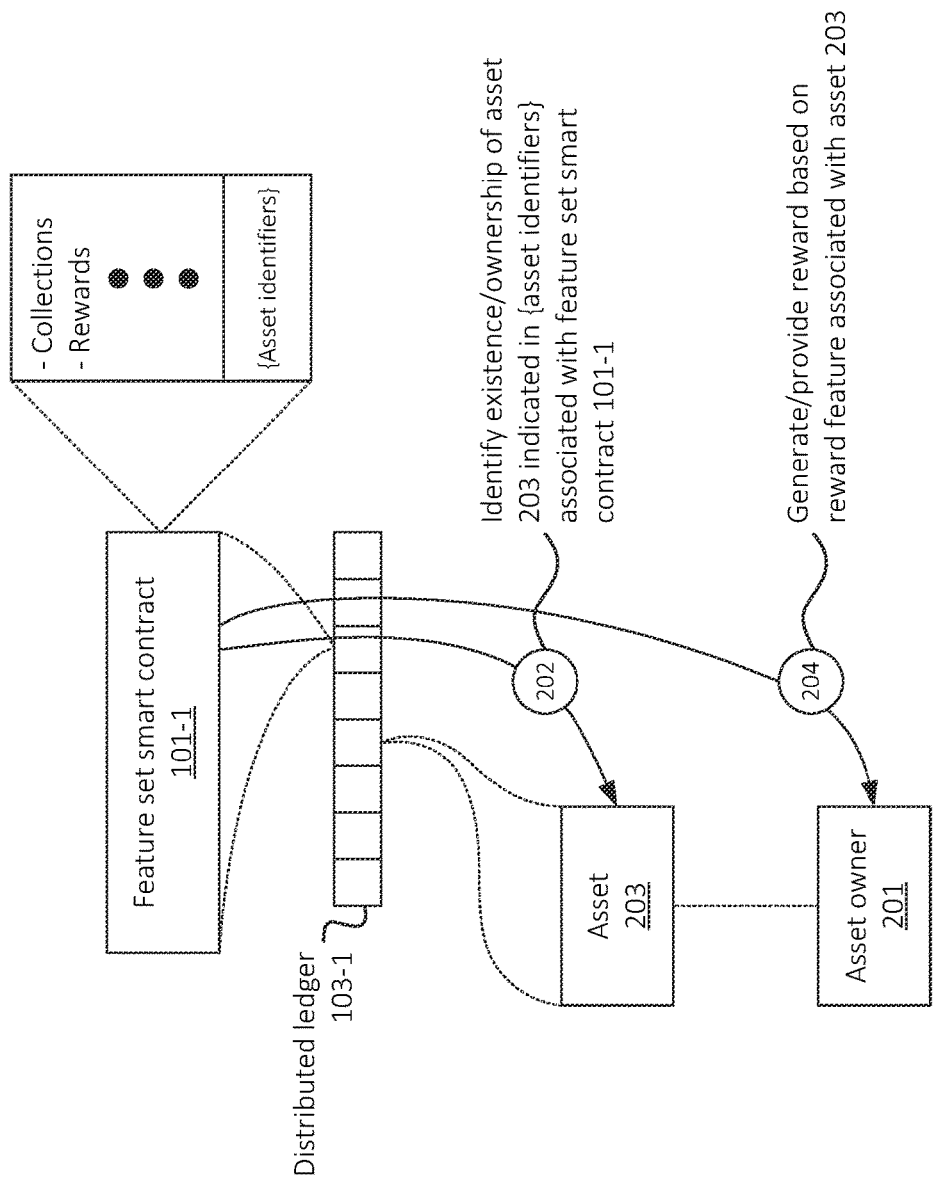

FIG. 2 illustrates an example of feature set smart contract 101-1 providing a reward to an owner 201 of a particular asset 203 on distributed ledger 103-1. For example, feature set smart contract 101-1 may be called, invoked, interacted with, etc. by owner 201, a decentralized application ("dApp"), and/or some other entity. Based on being called, invoked, etc., feature set smart contract 101-1 may identify (at 202) the existence and ownership of asset 203. In this example, assume that asset 203 is specified by feature set smart contract 101-1, and/or that asset 203 otherwise matches criteria specified for a "rewards" feature of feature set smart contract 101-1. The "ownership" of asset 203 may be specified in one or more fields, records, etc. associated with asset 203. For example, an "owner" field of asset 203 may return an identifier (e.g., address or other identifier) of owner 201, an "OwnerOf( )" function specified by asset 203 may return an identifier of owner 201, and/or feature set smart contract 101-1 may otherwise identify that asset 203 is "owned" by owner 201.

In some embodiments, for instance, asset 203 may implement, be an instance of, etc. a particular smart contract, protocol, etc. that defines operations, fields, data, etc. associated with NFTs or other types of assets. In some embodiments, asset 203 may implement, be an instance of, etc. an Ethereum Request for Comments 721 ("ERC-721") smart contract. In some embodiments, asset 203 may be some other suitable format that defines assets, including operations that may be performed with respect to assets (e.g., transfer, freeze, return ownership information, etc.), asset information or metadata (e.g., URL or other locator information of media, art, etc. signified by assets), provenance information (e.g., date of creation, identifier of an entity that created the asset, a present owner of the asset, a chain of ownership of the asset, etc.), linked asset information (e.g., an indication of other assets that are linked to or associated with the asset, including assets on other distributed ledgers 103), and/or other operations or information.

Based on identifying that owner 201 has ownership of asset 203, feature set smart contract 101-1 may generate and/or provide (at 204) a reward to owner 201. As noted above, such reward may include providing one or more additional assets to owner 201, generating or modifying a record (e.g., on distributed ledger 103-1 or some other record) indicating that owner 201 owns asset 203 at a given time, and/or some other type of operation.

In some embodiments, particular assets 203 may be independent from feature set smart contracts 101 that refer to such assets 203. For example, assets 203 may not have "knowledge" or "awareness" that such assets 203 are referred to by feature set smart contracts 101. In this manner, feature set smart contracts 101 may be developed and provided independently of assets 203, including development by entities different from entities that develop or provide assets 203. Further, feature set smart contracts 101 may be developed, modified, recorded to distributed ledgers 103, etc. after assets 203 are created.

Distributed ledgers 103 may be associated with "bridges" which may include and/or implement entities (e.g., smart contracts, wallets, applications, etc.) that are able to record data to, read data from, and/or otherwise interact with multiple distributed ledgers 103. For example, as shown in FIG. 3, bridge 301-1 may serve as a bridge between distributed ledgers 103-1 and distributed ledger 103-5, bridge 301-2 may serve as a bridge between distributed ledgers 103-2 and distributed ledger 103-5, bridge 301-3 may serve as a bridge between distributed ledgers 103-3 and distributed ledger 103-5, and bridge 301-4 may serve as a bridge between distributed ledgers 103-4 and distributed ledger 103-5.

Assume, for example, that a particular feature set smart contract 101 provides features (e.g., collections, rewards, etc.) for assets, such as asset 203, on distributed ledger 103-1. Further assume that asset 203 is bridged (e.g., via bridge 301-1) to distributed ledger 103-5. The bridging of asset 203 from distributed ledger 103-1 to distributed ledger 103-5 may include "freezing" or "burning" asset 203 on distributed ledger 103-1 (e.g., such that asset 203 is not able to be transferred or otherwise used on distributed ledger 103-1, since asset 203 has been bridged to another distributed ledger 103), and creating bridged asset 303. Bridged asset 303 may be a "cloned" version of asset 203 and/or may otherwise represent asset 203 on distributed ledger 103-5. For example, bridged asset 303 may include original provenance information included in asset 203, a link to asset 203 (e.g., an address of asset 203 on distributed ledger 103-1 and/or a chain identifier associated with distributed ledger 103-1), and/or other suitable information that indicates that bridged asset 303 represents asset 203 as bridged to distributed ledger 103-5.

Figure 3:
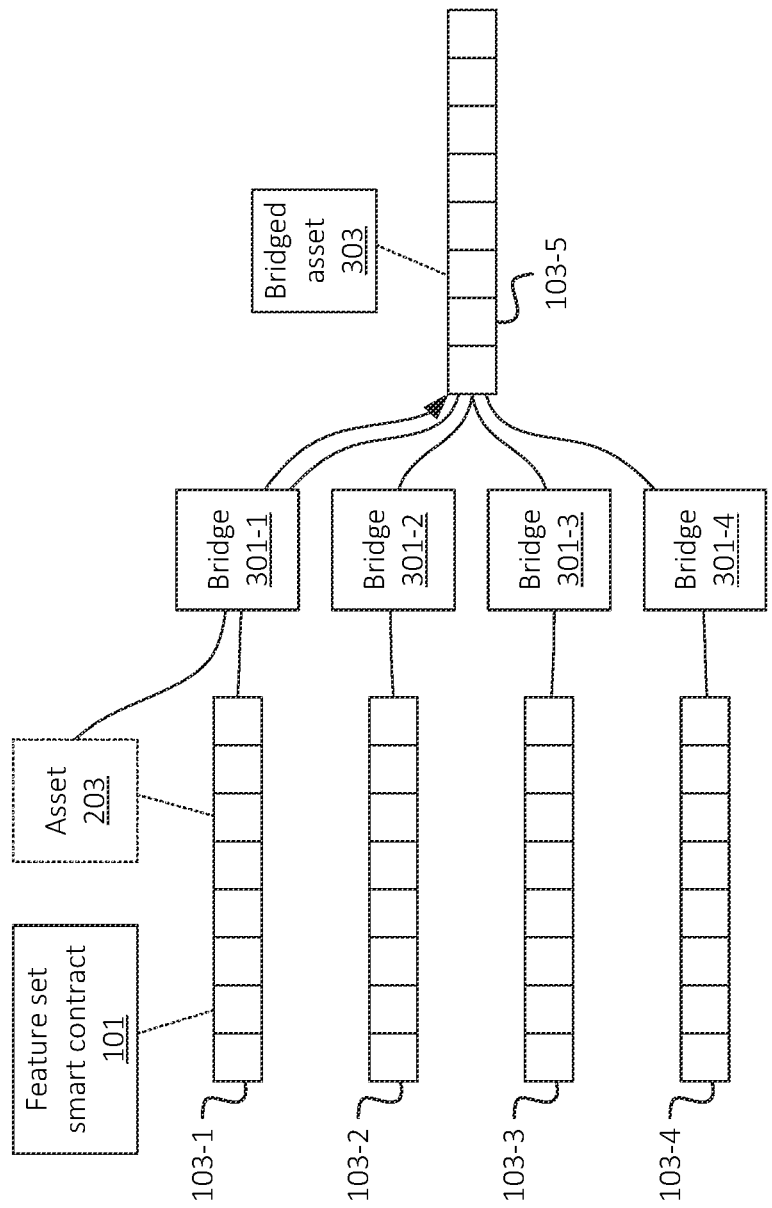
FIG. 3 illustrates an example of bridging an asset from one distributed ledger to another.

Embodiments described herein provide for feature set smart contract 101 to continue providing features to an owner of asset 203, even in situations where asset 203 is bridged to another distributed ledger 103 (e.g., to distributed ledger 103-5, in the example of FIG. 3). In this manner, a user who owns an asset on a first distributed ledger may continue to receive features specified by feature set smart contracts on the first distributed ledger, but may be able to bridge the asset to a second distributed ledger. One such instance includes a situation where the first distributed ledger is a private or less well-known distributed ledger, while the second distributed ledger is a public or more well-known distributed ledger, or is a distributed ledger on which more users or applications interact with. In this sense, the owner may be able to receive the increased visibility, exposure, etc. (e.g., in order to trade or display the user's assets) provided by the second distributed ledger, while still receiving features provided on the first distributed ledger.

Figure 4:
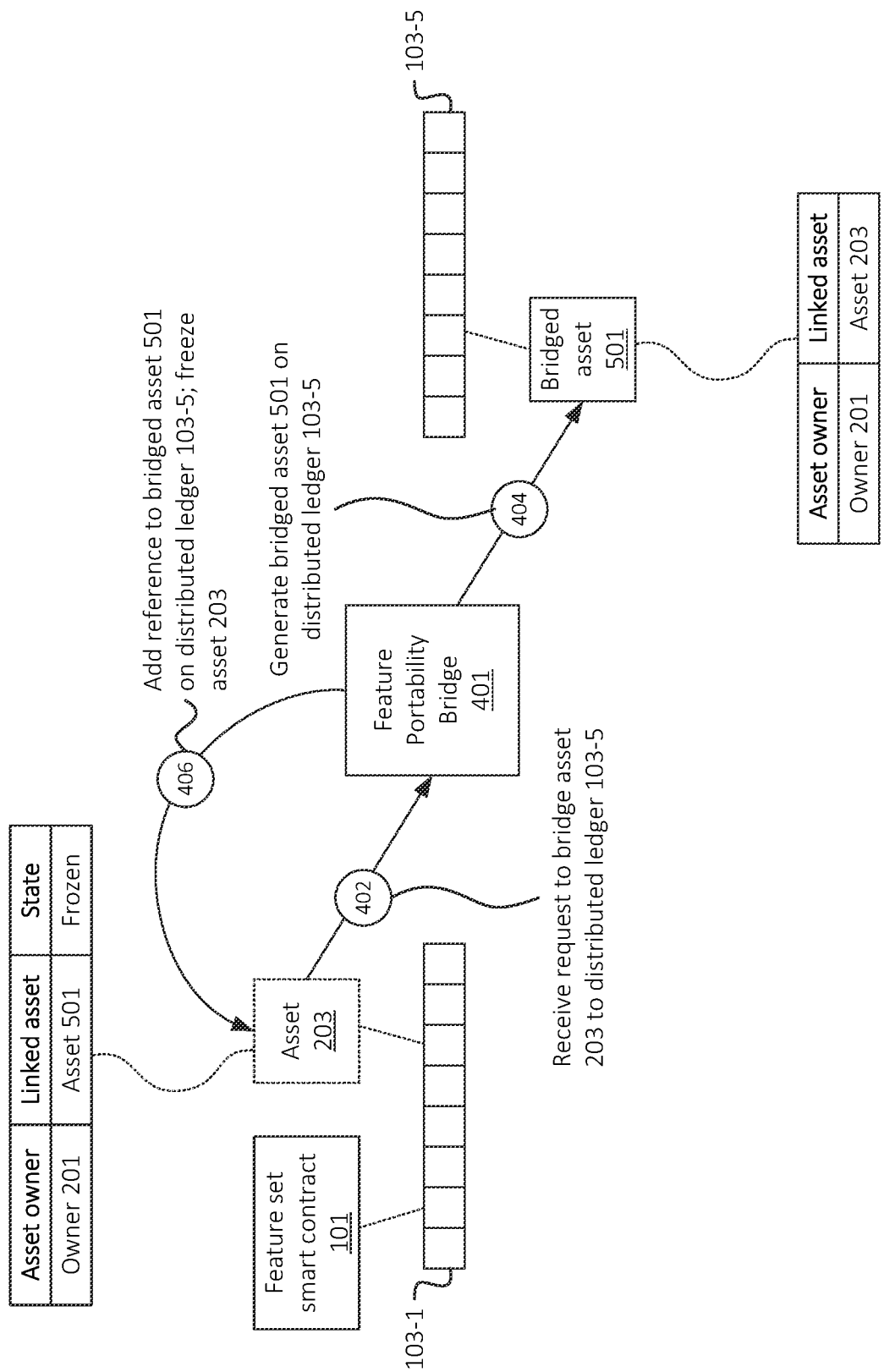
FIGS. 4 and 5 illustrate an example of bridging an asset from a first distributed ledger to a second distributed ledger while maintaining features of the asset on the first distributed ledger, in accordance with some embodiments.

As shown in FIG. 4, for example, Feature Portability Bridge ("FPB") 401 may aid in the bridging of assets, including example asset 203, between distributed ledgers 103-1 and 103-5, as well as the retention of features provided by feature set smart contract 101 on distributed ledger 103-1 for asset 203. FPB 401 may be implemented by one or more application servers, mobile telephones, cloud computing systems, laptop computers, Multi-Access/Mobile Edge Computing ("MEC") devices, and/or other types of devices. FPB 401 may implement or include one or more dApps or other types of applications that are able to communicate with multiple distributed ledgers 103, including distributed ledger 103-1 and distributed ledger 103-5. For example, FPB 401 may implement smart contracts, protocols, application programming interfaces ("APIs"), etc. associated with each one of distributed ledger 103-1 and distributed ledger 103-5. In some embodiments, FPB 401 may be associated with a first address or identifier associated with distributed ledger 103-1, and a second address or identifier associated with distributed ledger 103-5. In some embodiments, the address or identifier of FPB 401 may be the same on both distributed ledger 103-1 and distributed ledger 103-5. For example, the address of FPB 401 may be derived from a public key of a public/private key pair with which FPB 401 is associated (e.g., where the private key may be used by FPB 401 to digitally sign interactions with distributed ledgers 103-1 and 103-5, in order to allow for authentication of messages or other interactions performed by FPB 401).

FPB 401 may receive (at 402) a request to bridge asset 203 to distributed ledger 103-5. For example, FPB 401 may receive a request from owner 201 of asset 203, from a dApp, from a wallet, etc. FPB 401 may authenticate the request, such as by confirming permission or authorization from owner 201, which may include receiving a digital signature from owner 201 or some other suitable technique to verify authorization to perform the bridging. In some embodiments, FPB 401 may (e.g., based on receiving (at 402) the request to bridge asset 203) request an ongoing permission or authorization from owner 201 to perform further operations on asset 203, such as permission to freeze asset 203 or to transfer ownership of asset 203 (e.g., to transfer ownership of asset 203 to FPB 401, to a "burn" address, or to some other entity). Examples of such further operations are described below.

Based on receiving (at 402) the request to bridge asset 203 to distributed ledger 103-5, and assuming that FPB 401 has verified authorization for the bridging and/or has authenticated the request, FPB 401 may generate (at 404) bridged asset 501 on distributed ledger 103-5. In some embodiments, bridged asset 501 may include, implement, be an instance of, etc. the same type of smart contract, protocol, etc., as asset 203. For example, in some embodiments, asset 203 and bridged asset 501 may both implement, be an instance of, etc. an ERC-721 smart contract. In some embodiments, bridged asset 501 may be associated with a different protocol, smart contract, etc. as asset 203. In such embodiments, FPB 401 may translate certain fields, operations, etc. from a format or protocol associated with asset 203 with a format or protocol associated with bridged asset 501. In some embodiments, FPB 401 may maintain or receive information indicating particular formats, protocols, smart contracts, etc. implemented by various distributed ledgers 103, and may perform such translation in the event that the source distributed ledger 103 (i.e., distributed ledger 103-1 in this example) implements different protocols, smart contracts, etc. than the target distributed ledger 103 (i.e., distributed ledger 103-5 in this example). For example, a particular protocol associated with asset 203 on distributed ledger 103-1 may include an "OwnerOf( )" function, which when called, returns an identifier of owner 201. Assume that a protocol associated with bridged asset 501 on distributed ledger 103-5 includes an "OwnedBy( )" function, which would also return an identifier of an owner of bridged asset 501. FPB 401 may maintain information indicating that the "OwnerOf( )" and "OwnedBy( )" functions are correlated, and may cause the output of the "OwnedBy( )" function to return the same value (e.g., an identifier of owner 201) as the "OwnerOf( )" function.

Distributed ledger 103-5 may include a link to asset 203, such as an address or asset identifier of asset 203 on distributed ledger 103-1. Distributed ledger 103-5 may include some or all of the information included in or specified by asset 203, including provenance information (e.g., an owner and/or creator of asset 203 on distributed ledger 103-1, a date of creation of asset 203, etc.), asset information (e.g., a URL or other locator information of media, art, etc. signified by asset 203), and/or other information. Bridged asset 501 may also include information indicating that an owner of bridged asset 501 itself is owner 201 (e.g., the same owner as asset 203).

Further based on receiving (at 402) the request to bridge asset 203 to distributed ledger 103-5, FPB 401 may add (at 406) a reference or link to asset 203, referencing bridged asset 501 on distributed ledger 103-5. For example, FPB 401 may record information to distributed ledger 103-1, indicating that asset 203 is linked to or otherwise references bridged asset 501. As such, an entity that accesses, reads, etc. distributed ledger 103-1 may, based on the recorded information, identify that asset 203 is associated with, linked to, references, etc. bridged asset 501. For example, such entity may maintain a "world state" associated with distributed ledger 103-1, which may be a database or other type of data structure that includes valid and/or up-to-date information associated with distributed ledger 103-1. The world state may indicate the latest values for particular fields, attributes, etc., in instances where distributed ledger 103-1 includes conflicting or multiple versions of such values. Since distributed ledger 103-1 may be immutable (e.g., data recorded to distributed ledger 103-1 may not be able to be changed, removed, etc. once recorded), the world state may be used to readily identify the current, up-to-date state of parameters, assets (such as asset 203), etc. for which data has been recorded to distributed ledger 103-1. For example, an asset that is transferred numerous times may include multiple ownership records reflecting multiple owners, and the world state may indicate the latest, most recent, etc. owner of the multiple owners.

The reference or link added to asset 203 may include an address of bridged asset 501 on distributed ledger 103-5, a chain identifier of distributed ledger 103-5, and/or other suitable information associated with bridged asset 501. FPB 401 may also freeze (at 406) asset 203 based on the bridging to distributed ledger 103-5. In some embodiments, the freezing of asset 203 may include setting a "frozen" field of asset 203 to "true" or "frozen," invoking a "Freeze( )" function specified in asset 203, and/or otherwise modifying asset 203 to reflect that asset 203 is frozen. In some embodiments, some other status or field may be used, such as a "bridged" status, a "locked" status, etc. In some embodiments, the "frozen," "bridged," etc. status of asset 203 may signify (e.g., to other smart contracts, nodes, etc. of distributed ledger 103-1) that asset 203 is not eligible to be transferred (e.g., from owner 201 to another owner on distributed ledger 103-1), bridged again (e.g., from distributed ledger 103-1 to another distributed ledger 103), or otherwise altered. That is, since asset 203 has been bridged to distributed ledger 103-5, allowing such operations on distributed ledger 103-1 (e.g., in lieu of freezing asset 203) would result in owner 201 effectively having possession of two copies of asset 203 (e.g., asset 203 on distributed ledger 103-1 and bridged asset 501 on distributed ledger 103-5).

In some embodiments, operations 404 and 406 may be performed "atomically." For example, operations 404 and 406 may be performed sequentially or concurrently, and if either operation fails for any reason, the other operation may be reverted or may not be performed at all. In some embodiments, as noted above, FPB 401 may have previously received approval, authorization, etc. from owner 201 to modify asset 203 (e.g., to set the status of FPB 401 to "frozen," to add the reference to bridged asset 501, etc.), and may use such approval, authorization, etc. to make such modifications. Additionally, or alternatively, a dApp or other entity that receives (at 402) the request to bridge asset 203 may determine that approval from owner 201 is required (e.g., as an input to a bridging operation provided by FPB 401), and may request authorization (e.g., a signed message or other suitable authorization indication) from owner 201 based on receiving (at 402) the request to bridge asset 203.

Figure 5:
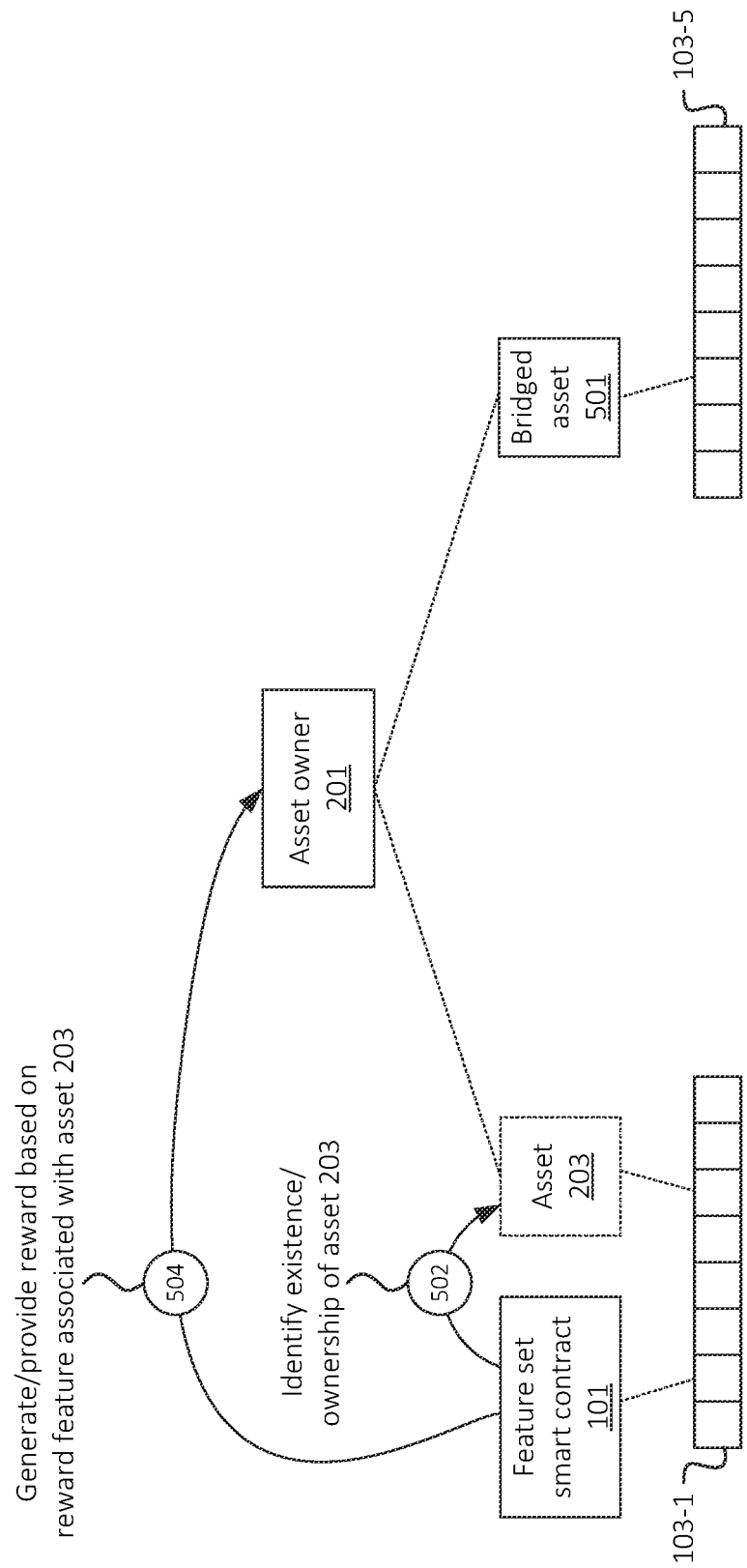

As discussed herein, maintaining asset 203 in the frozen state on distributed ledger 103-1 may allow for bridged asset 501 to be freely transferred, displayed, and/or otherwise interacted with on distributed ledger 103-5, while allowing owner 201 to continue receiving features provided by feature set smart contract 101 on distributed ledger 103-1. For example, as shown in FIG. 5, while asset 203 exists on distributed ledger 103-1 in the frozen state and bridged asset 501 exists on distributed ledger 103-5, feature set smart contract 101 may identify (at 502) the existence and ownership of asset 203 on distributed ledger 103-1. Feature set smart contract 101 may, in some embodiments, ignore or may not recognize the "frozen" status of asset 203, and/or may otherwise identify the existence and ownership of asset 203 irrespective of its frozen status. As noted above, feature set smart contract 101 may identify (at 502) the existence and ownership of asset 203 based on being called, invoked, etc. by a dApp, by owner 201, and/or some other suitable entity. Based on identifying (at 502) the existence and ownership of asset 203, feature set smart contract 101 may proceed to generate and/or provide (at 504) a reward or other feature to owner 201. Thus, although asset 203 has been bridged to distributed ledger 103-5 (e.g., as bridged asset 501), owner 201 may continue to receive features on distributed ledger 103-1 as provided by feature set smart contract 101.

Figure 6:
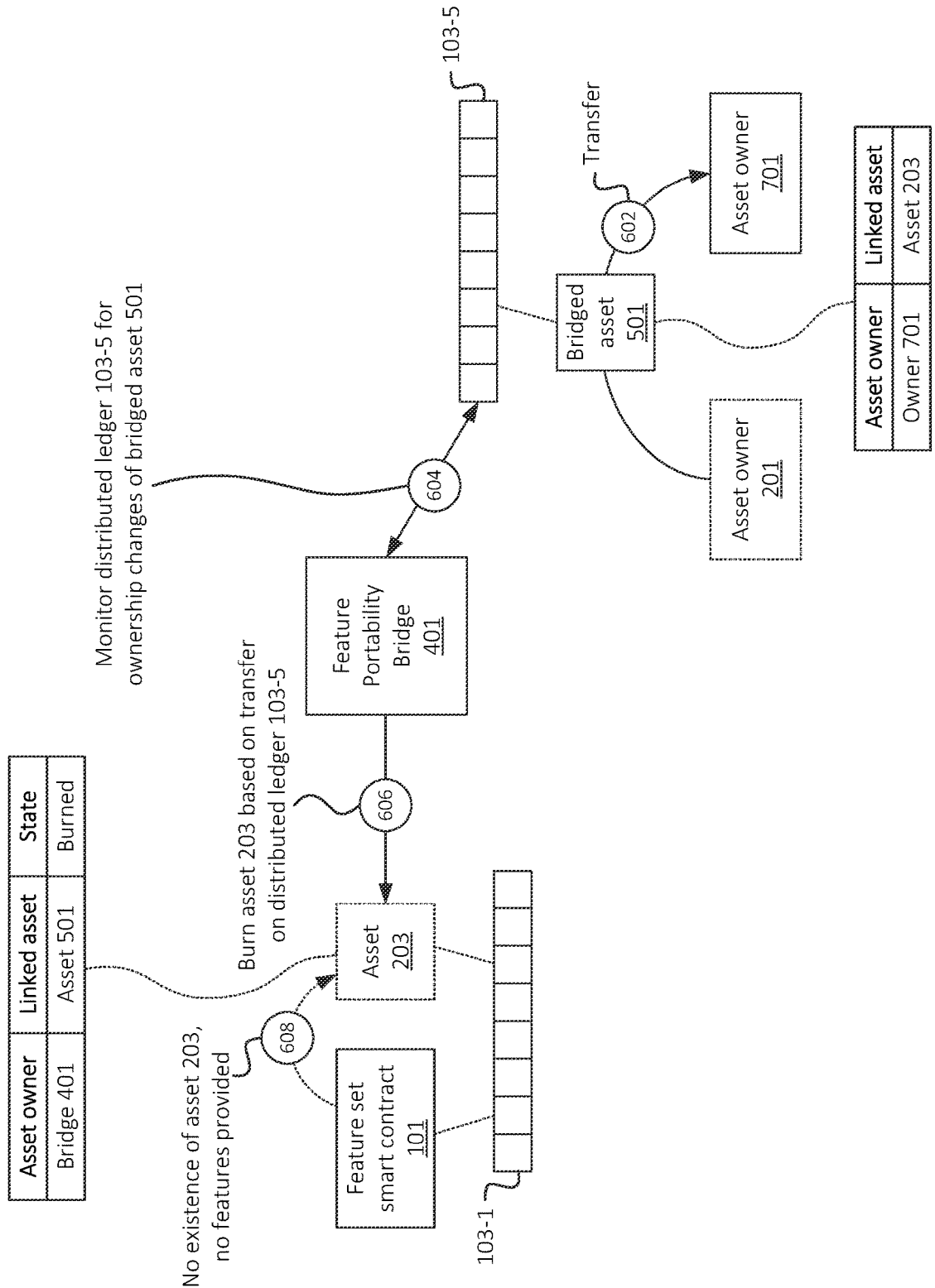
FIG. 6 illustrates an example of a bridged asset being transferred, in accordance with some embodiments.

In some embodiments, if bridged asset 501 is transferred (e.g., on distributed ledger 103-5) from owner 201 to another owner, feature set smart contract 101 may cease providing features to owner 201. That is, once owner 201 transfers ownership of bridged asset 501 on distributed ledger 103-5, owner 201 would cease being the rightful owner of corresponding asset 203 on distributed ledger 103-1. For example, as shown in FIG. 6, assume that owner 201 transfers (at 602) bridged asset 501 to another entity, such as owner 701. The transfer may be effected by way of one or more calls, interactions, etc. with distributed ledger 103-5, such as by invoking a "Transfer( )" function or other suitable function associated with bridged asset 501. For example, as discussed above, bridged asset 501 may be an ERC-721 asset or may implement, be an instance of, etc. one or more other types of smart contracts or protocols that include an operation by which bridged asset 501 may be transferred from one owner to another. In some embodiments, owner 201 may invoke a transfer operation of asset 203, on distributed ledger 103-1, to owner 701. In such embodiments, FPB 401 (and/or some other entity, such as a dApp via which owner 201 invokes the transfer function) may detect the invocation of the transfer function, and may redirect the transfer operation to bridged asset 501 on distributed ledger 103-5.

FPB 401 may detect (at 604) the change in ownership of bridged asset 501. For example, FPB 401 may monitor distributed ledger 103-5, may "listen" for changes to bridged asset 501, etc. In some embodiments, FPB 401 may monitor distributed ledger 103-5 for ownership changes, transfers, or other operations performed with respect to assets that have been bridged to distributed ledger 103-5 by FPB 401. Additionally, or alternatively, FPB 401 may monitor distributed ledger 103-5 for operations performed with respect to assets that are referenced by assets on distributed ledger 103-1. For example, FPB 401 may identify that bridged asset 501 is referenced by asset 203 (e.g., asset 203 includes information indicating that asset 203 is linked to bridged asset 501). Additionally, or alternatively, FPB 401 may monitor distributed ledger 103-5 for operations performed with respect to assets that are in a "frozen" or "bridged" state on distributed ledger 103-1. In some embodiments, FPB 401 may monitor distributed ledger 103-5 and/or other distributed ledgers 103 (e.g., to identify operations performed with respect to assets on such distributed ledgers 103) based on one or more other triggers, conditions, criteria, etc.

In this example, as FPB 401 determines that bridged asset 501 has been transferred from owner 201, FPB 401 may burn (at 606) asset 203. "Burning" asset 203 may include FPB 401 taking ownership of asset 203, transferring asset 203 to a "burn" address or smart contract, or otherwise making asset 203 unavailable on distributed ledger 103-1. Additionally, or alternatively, FPB 401 may set a state or status field of asset 203 to "burned," which signifies that asset 203 is no longer owned by owner 201 and/or that asset 203 is otherwise no longer a valid or existing asset on distributed ledger 103-1.

Feature set smart contract 101 may, when invoked (e.g., by owner 201, a dApp, or some other entity) may determine (at 608) that asset 203 does not exist, and/or may determine that asset 203 has been burned, may determine that asset 203 is owned by FPB 401, and/or may otherwise not recognize the existence of asset 203 on distributed ledger 103-1. As such, feature set smart contract 101 may not provide features associated with asset 203, which may have otherwise been provided. For example, instead of providing a reward to an owner of asset 203, feature set smart contract 101 may instead forgo providing any rewards associated with asset 203, may provide such rewards to another entity, and/or may perform some other suitable operation. Accordingly, since bridged asset 501 has been transferred on distributed ledger 103-5, the previous owner 201 may no longer receive rewards or other features specified by feature set smart contract 101. The removal of eligibility of owner 201 to receive such rewards or features may serve to maintain the integrity and functionality of feature set smart contract 101, as providing such rewards or features to owner 201 after owner 201 has transferred ownership of bridged asset 501 would result in owner 201 receiving rewards or features for an asset that is no longer owned by owner 201.

Figure 7:
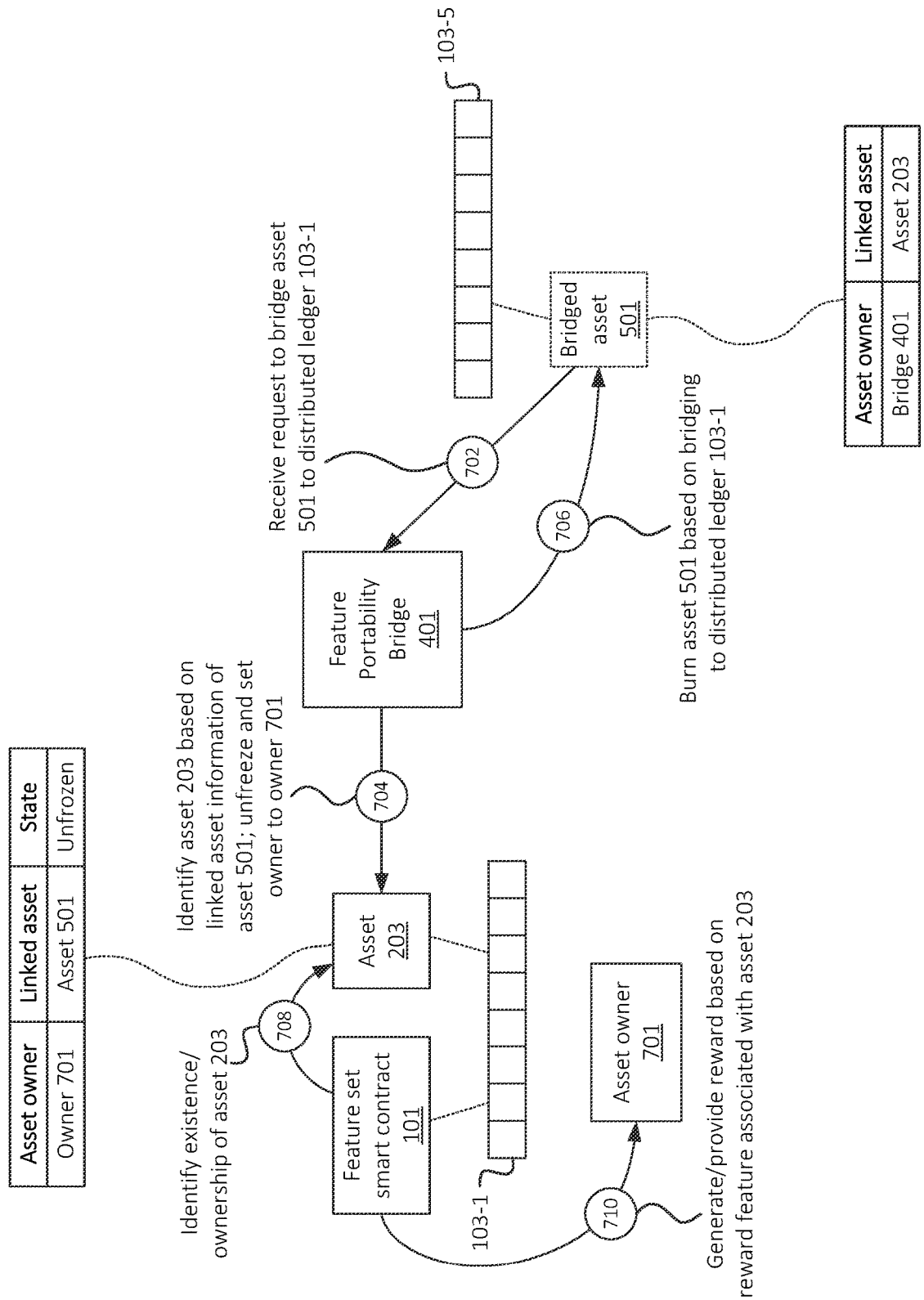
FIG. 7 illustrates an example of a bridged asset being bridged back to a distributed ledger on which the asset was previously present, in accordance with some embodiments.

In some embodiments, FPB 401 may be used to bridge asset 501 back to distributed ledger 103-1, including after transfer of bridged asset 501 from owner 201 to owner 701. For example, as shown in FIG. 7, FPB 401 may receive (at 702) a request to bridge bridged asset 501 to distributed ledger 103-1. Based on receiving the request, FPB 401 may identify (at 704) that bridged asset 501 is associated with asset 203, which already exists on distributed ledger 103-1. For example, in embodiments where the locking or burning of asset 203 (at 606) includes FPB 401 taking ownership of asset 203 and/or setting a status of asset 203 to "burned" (or some other suitable status), asset 203 may still be able to be modified, invoked, etc. by FPB 401. In such instances, FPB 401 may, based on receiving the request to bridge bridged asset 501 to distributed ledger 103-1, unfreeze asset 203 and/or set the owner to owner 701. For example, FPB 401 may set a status or state field of asset 203 to "unfrozen," "unlocked," etc., and may set an owner of asset 203 to owner 701 (e.g., may change ownership of asset 203 from FPB 401 to owner 701).

In some embodiments, FPB 401 may leave the reference to bridged asset 501 in asset 203 (e.g., as a linked asset associated with asset 203), or may remove the reference to bridged asset 501 from asset 203. Further, bridging bridged asset 501 to distributed ledger 103-1 may include burning (at 706) bridged asset 501 on distributed ledger 103-5. For example, FPB 401 may modify ownership of bridged asset 501 to indicate that FPB 401 or some other suitable entity (e.g., a "burn" address of distributed ledger 103-5) is the owner of bridged asset 501, may set a status of bridged asset 501 to "burned" or "locked" (e.g., in instances where bridged asset 501 and/or distributed ledger 103-5 support such functionality), and/or may make bridged asset 501 otherwise unavailable for modification by owner 701 on distributed ledger 103-5. In this manner, owner 701 may only have one access to the underlying asset (e.g., asset 203 on distributed ledger 103-1), rather than having access to asset 203 on distributed ledger 103-1 in addition to bridged asset 501 on distributed ledger 103-5 (e.g., two duplicate copies). As such, the integrity and provenance of asset 203 may be maintained.

Once owner 701 is the owner of asset 203 on distributed ledger 103-1, feature set smart contract 101 may provide features, associated with asset 203, to owner 701. For example, feature set smart contract 101 may be invoked, called, etc., and may accordingly identify (at 708) the existence and ownership of asset 203 on distributed ledger 103-1. For example, since asset 203 is now owned by owner 701, feature set smart contract 101 may identify that owner 701 owns asset 203 and may accordingly generate and/or provide (at 710) rewards or other features, associated with asset 203, to owner 701.

Figure 8:
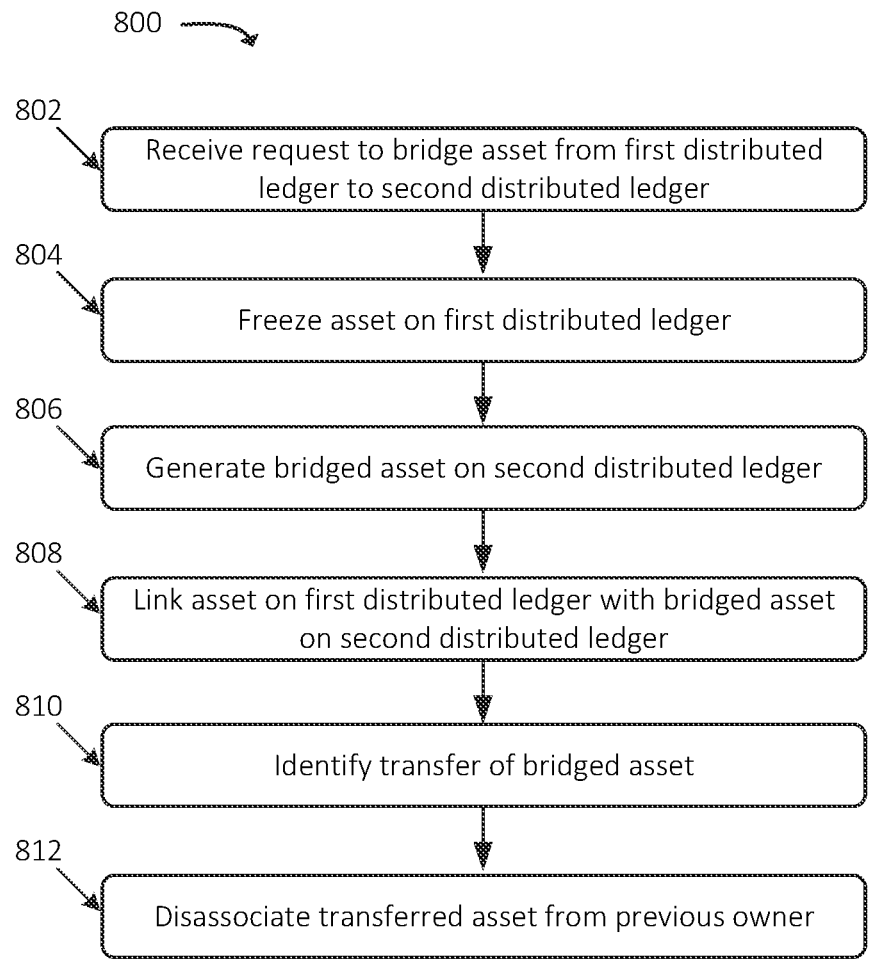
FIG. 8 illustrates an example process for bridging an asset from a first distributed ledger to a second distributed ledger while maintaining features of the asset on the first distributed ledger, in accordance with some embodiments.

FIG. 8 illustrates an example process 800 for bridging an asset from a first distributed ledger to a second distributed ledger while maintaining features of the asset on the first distributed ledger, in accordance with some embodiments. In some embodiments, some or all of process 800 may be performed by FPB 401. In some embodiments, one or more other devices may perform some or all of process 800 in concert with, and/or in lieu of, FPB 401.

As shown, process 800 may include receiving (at 802) a request to bridge an asset from a first distributed ledger to a second distributed ledger. For example, as similarly discussed above, FPB 401 may receive a request to bridge asset 203 from a distributed ledger 103-1 to distributed ledger 103-5. Asset 203 may be an ERC-721 asset or some other type of asset, which may be associated with a defined set of operations. Such operations may include, for example, returning ownership or provenance information of asset 203, setting a state or status associated with asset 203 (e.g., "frozen," "unfrozen," "burned," etc.), linking or otherwise associating asset 203 with one or more other assets or records, transferring asset 203 from one owner to another, or other suitable operations. FPB 401 may implement protocols, APIs, etc. associated with distributed ledgers 103-1 and 103-5, and accordingly may be able to interact with (e.g., invoke smart contracts, record data, access, etc.) distributed ledgers 103-1 and 103-5. As discussed above, in some examples, distributed ledger 103-1 may be associated with one or more feature set smart contracts 101, which may provide features or other functionality to an owner of asset 203. In some embodiments, FPB 401 may authenticate the request, such as by verifying that a digital signature associated with the request indicates that the request was provided or authorized by an owner of asset 203.

Process 800 may further include freezing (at 804) the asset on the first distributed ledger, based on receiving the request to bride the asset. For example, FPB 401 may record information to the first distributed ledger, indicating that a state of asset 203 is "frozen" or some other suitable state. The freezing of asset 203 may prevent asset 203 from being transferred from the owner of asset 203 to another owner, from being bridged to another distributed ledger 103, and/or other operations that would result in a duplicate or copy of asset 203 being created.

Process 800 may additionally include generating (at 806) the bridged asset on the second distributed ledger. For example, FPB 401 may interact with distributed ledger 103-5 (e.g., one or more smart contracts recorded to distributed ledger 103-5) to instantiate, create, etc. bridged asset 501 on distributed ledger 103-5. As discussed above, bridged asset 501 may include some or all information recorded to distributed ledger 103-1 associated with asset 203, such as provenance information, asset information (e.g., URLs, links, etc. to art, media, or other data signified by asset 203), etc. In the event that bridged asset 501 already exists on distributed ledger 103-5 (e.g., in a "frozen" or "burned" state or some other state), FPB 401 may set the state of bridged asset 501 to ("unfrozen," "active," etc.). FPB 401 may set the owner of bridged asset 501 to the owner (e.g., owner 201) of asset 203, which may include an address or other identifier of owner 201.

Process 800 may also include linking (at 808) the asset, on the first distributed ledger, with the bridged asset on the second distributed ledger. For example, FPB 401 may record information to distributed ledger 103-1, indicating that asset 203 is linked to, refers to, and/or is otherwise associated with bridged asset 501. Additionally, or alternatively, FPB 401 may record information to distributed ledger 103-2, indicating that bridged asset 501 is linked to, refers to, and/or is otherwise associated with asset 203. For example, the sets of operations associated with asset 203 and/or bridged asset 501 may include one or more operations by which linked assets may be defined for asset 203 and/or bridged asset 501, including assets on other distributed ledgers 103.

As discussed above, although asset 203 has been bridged to distributed ledger 103-5 and frozen on distributed ledger 103-1, the ownership information of asset 203 may remain unchanged, and feature set smart contract 101 may continue to provide features or other functionality based on the ownership of asset 203 by owner 201. For example, feature set smart contract 101 may continue to provide rewards or other features to owner 201 based on the continued ownership of asset 203, even though asset 203 was bridged. For example, bridged asset 501, to which asset 203 is linked, may also be owned by owner 201, and owner 201 may thus remain as the "rightful" owner of asset 203, even though asset 203 has been bridged from distributed ledger 103-1.

Process 800 may further include identifying (at 810) a transfer of the bridged asset. For example, owner 201 may, via a dApp, a wallet application, etc. interact with distributed ledger 103-1 and/or distributed ledger 103-5 to transfer bridged asset 501 to a different owner (e.g., owner 701). For example, if the transfer request is received via a dApp that interacts with distributed ledger 103-1, the dApp may detect that asset 203 is linked to bridged asset 501 on distributed ledger 103-5 (e.g., based on a reference to bridged asset 501 in information associated with asset 203 on distributed ledger 103-1), and may accordingly redirect the request to distributed ledger 103-5 (e.g., may redirect a transfer associated with asset 203, to a transfer associated with bridged asset 501). On the other hand, the request may be received via an interaction with distributed ledger 103-5, such as a request to transfer bridged asset 501 to owner 701. As discussed above, FPB 401 may monitor distributed ledger 103-1 and/or distributed ledger 103-5 to identify the transfer of bridged asset 501. Generally, for example, FPB 401 may monitor distributed ledger 103-1 and/or distributed ledger 103-5 for transfers or other state changes of assets on different distributed ledgers 103 that are linked to each other (e.g., as indicated in links or references associated with such assets).

Process 800 may additionally include disassociating (at 812) the transferred asset from the previous owner. For example, FPB 401 may record information to distributed ledger 103-1, indicating that asset 203 is no longer owned by owner 201. For example, FPB 401 may transfer asset 203 to itself, may burn asset 203 (e.g., may set a state of asset 203 to "burned," may transfer asset 203 to a "burn address" of distributed ledger 103-1, etc.), and/or may otherwise disassociate asset 203 from owner 201. In some embodiments, FPB 401 may associate asset 203 with the new owner 701. For example, FPB 401 may record information distributed ledger 103-1 indicating that distributed ledger 103-1 has been transferred to owner 701. As such, feature set smart contract 101 may cease providing features, functionality, etc. to previous owner 201, as bridged asset 501 (with which asset 203 is linked) has been transferred to a new owner 701. In some embodiments, feature set smart contract 101 may proceed to provide such features, functionality, etc. to owner 701, in instances where criteria, conditions, etc. specified by feature set smart contract 101 are met.

Figure 9:
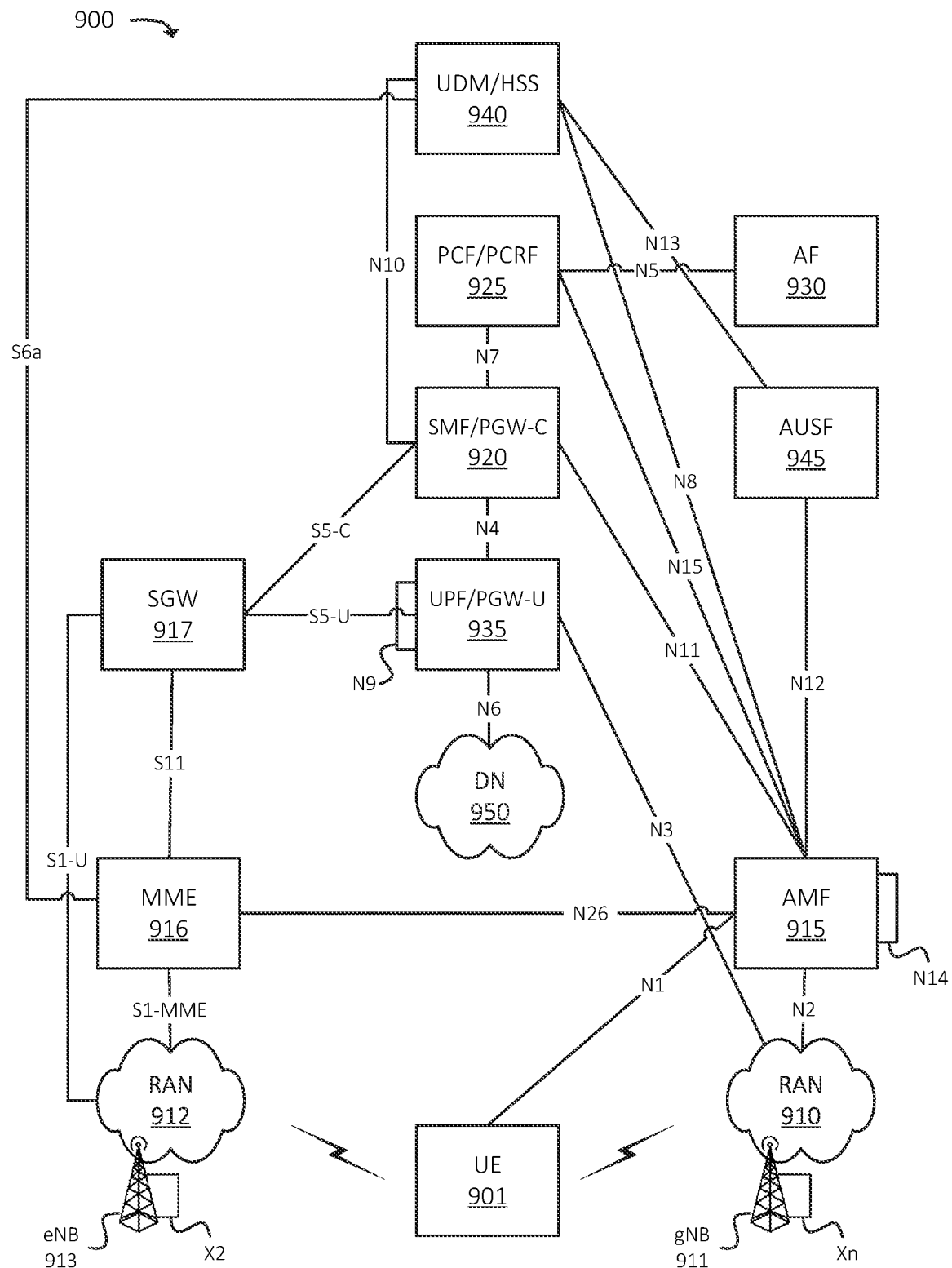
FIG. 9 illustrates an example environment in which one or more embodiments, described herein, may be implemented.

FIG. 9 illustrates an example environment 900, in which one or more embodiments may be implemented. In some embodiments, environment 900 may correspond to a Fifth Generation ("5G") network, and/or may include elements of a 5G network. In some embodiments, environment 900 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 900 may represent or may include a 5G core ("5GC"). As shown, environment 900 may include UE 901, RAN 910 (which may include one or more Next Generation Node Bs ("gNBs") 911), RAN 912 (which may include one or more evolved Node Bs ("eNBs") 913), and various network functions such as Access and Mobility Management Function ("AMF") 915, Mobility Management Entity ("MME") 916, Serving Gateway ("SGW") 917, Session Management Function ("SMF")/Packet Data Network ("PDN") Gateway ("PGW")-Control plane function ("PGW-C") 920, Policy Control Function ("PCF")/Policy Charging and Rules Function ("PCRF") 925, Application Function ("AF") 930, User Plane Function ("UPF")/PGW-User plane function ("PGW-U") 935, Unified Data Management ("UDM")/Home Subscriber Server ("HSS") 940, and Authentication Server Function ("AUSF") 945. Environment 900 may also include one or more networks, such as Data Network ("DN") 950. Environment 900 may include one or more additional devices or systems communicatively coupled to one or more networks (e.g., DN 950).

The example shown in FIG. 9 illustrates one instance of each network component or function (e.g., one instance of SMF/PGW-C 920, PCF/PCRF 925, UPF/PGW-U 935, UDM/HSS 940, and/or AUSF 945). In practice, environment 900 may include multiple instances of such components or functions. For example, in some embodiments, environment 900 may include multiple "slices" of a core network, where each slice includes a discrete and/or logical set of network functions (e.g., one slice may include a first instance of SMF/PGW-C 920, PCF/PCRF 925, UPF/PGW-U 935, UDM/HSS 940, and/or AUSF 945, while another slice may include a second instance of SMF/PGW-C 920, PCF/PCRF 925, UPF/PGW-U 935, UDM/HSS 940, and/or AUSF 945). The different slices may provide differentiated levels of service, such as service in accordance with different Quality of Service ("QoS") parameters.

The quantity of devices and/or networks, illustrated in FIG. 9, is provided for explanatory purposes only. In practice, environment 900 may include additional devices and/or networks, fewer devices and/or networks, different devices and/or networks, or differently arranged devices and/or networks than illustrated in FIG. 9. For example, while not shown, environment 900 may include devices that facilitate or enable communication between various components shown in environment 900, such as routers, modems, gateways, switches, hubs, etc. Alternatively, or additionally, one or more of the devices of environment 900 may perform one or more network functions described as being performed by another one or more of the devices of environment 900. Devices of environment 900 may interconnect with each other and/or other devices via wired connections, wireless connections, or a combination of wired and wireless connections. In some implementations, one or more devices of environment 900 may be physically integrated in, and/or may be physically attached to, one or more other devices of environment 900.

UE 901 may include a computation and communication device, such as a wireless mobile communication device that is capable of communicating with RAN 910, RAN 912, and/or DN 950. UE 901 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 901 may send traffic to and/or receive traffic (e.g., user plane traffic) from DN 950 via RAN 910, RAN 912, and/or UPF/PGW-U 935. In some embodiments, UE 901 may implement bridge 301, FPB 401, one or more nodes that implement one or more distributed ledgers 103, and/or one or more applications (e.g., wallets, explorers, etc.) that access or interact with one or more distributed ledgers 103. For example, UE 901 may be associated with a particular owner of a particular asset on one or more distributed ledgers 103, and bridge requests, transfer requests, etc. may be received via UE 901.

RAN 910 may be, or may include, a 5G RAN that includes one or more base stations (e.g., one or more gNBs 911), via which UE 901 may communicate with one or more other elements of environment 900. UE 901 may communicate with RAN 910 via an air interface (e.g., as provided by gNB 911). For instance, RAN 910 may receive traffic (e.g., voice call traffic, data traffic, messaging traffic, signaling traffic, etc.) from UE 901 via the air interface, and may communicate the traffic to UPF/PGW-U 935, and/or one or more other devices or networks. Similarly, RAN 910 may receive traffic intended for UE 901 (e.g., from UPF/PGW-U 935, AMF 915, and/or one or more other devices or networks) and may communicate the traffic to UE 901 via the air interface.

RAN 912 may be, or may include, a LTE RAN that includes one or more base stations (e.g., one or more eNBs 913), via which UE 901 may communicate with one or more other elements of environment 900. UE 901 may communicate with RAN 912 via an air interface (e.g., as provided by eNB 913). For instance, RAN 912 may receive traffic (e.g., voice call traffic, data traffic, messaging traffic, signaling traffic, etc.) from UE 901 via the air interface, and may communicate the traffic to UPF/PGW-U 935, and/or one or more other devices or networks. Similarly, RAN 912 may receive traffic intended for UE 901 (e.g., from UPF/PGW-U 935, SGW 917, and/or one or more other devices or networks) and may communicate the traffic to UE 901 via the air interface.

AMF 915 may include one or more devices, systems, Virtualized Network Functions ("VNFs"), Cloud-Native Network Functions ("CNFs"), etc., that perform operations to register UE 901 with the 5G network, to establish bearer channels associated with a session with UE 901, to hand off UE 901 from the 5G network to another network, to hand off UE 901 from the other network to the 5G network, manage mobility of UE 901 between RANs 910 and/or gNBs 911, and/or to perform other operations. In some embodiments, the 5G network may include multiple AMFs 915, which communicate with each other via the N14 interface (denoted in FIG. 9 by the line marked "N14" originating and terminating at AMF 915).

MME 916 may include one or more devices, systems, VNFs, CNFs, etc., that perform operations to register UE 901 with the EPC, to establish bearer channels associated with a session with UE 901, to hand off UE 901 from the EPC to another network, to hand off UE 901 from another network to the EPC, manage mobility of UE 901 between RANs 912 and/or eNBs 913, and/or to perform other operations.

SGW 917 may include one or more devices, systems, VNFs, CNFs, etc., that aggregate traffic received from one or more eNBs 913 and send the aggregated traffic to an external network or device via UPF/PGW-U 935. Additionally, SGW 917 may aggregate traffic received from one or more UPF/PGW-Us 935 and may send the aggregated traffic to one or more eNBs 913. SGW 917 may operate as an anchor for the user plane during inter-eNB handovers and as an anchor for mobility between different telecommunication networks or RANs (e.g., RANs 910 and 912).

SMF/PGW-C 920 may include one or more devices, systems, VNFs, CNFs, etc., that gather, process, store, and/or provide information in a manner described herein. SMF/PGW-C 920 may, for example, facilitate the establishment of communication sessions on behalf of UE 901. In some embodiments, the establishment of communications sessions may be performed in accordance with one or more policies provided by PCF/PCRF 925.

PCF/PCRF 925 may include one or more devices, systems, VNFs, CNFs, etc., that aggregate information to and from the 5G network and/or other sources. PCF/PCRF 925 may receive information regarding policies and/or subscriptions from one or more sources, such as subscriber databases and/or from one or more users (such as, for example, an administrator associated with PCF/PCRF 925).

AF 930 may include one or more devices, systems, VNFs, CNFs, etc., that receive, store, and/or provide information that may be used in determining parameters (e.g., quality of service parameters, charging parameters, or the like) for certain applications.

UPF/PGW-U 935 may include one or more devices, systems, VNFs, CNFs, etc., that receive, store, and/or provide data (e.g., user plane data). For example, UPF/PGW-U 935 may receive user plane data (e.g., voice call traffic, data traffic, etc.), destined for UE 901, from DN 950, and may forward the user plane data toward UE 901 (e.g., via RAN 910, SMF/PGW-C 920, and/or one or more other devices). In some embodiments, multiple UPFs 935 may be deployed (e.g., in different geographical locations), and the delivery of content to UE 901 may be coordinated via the N9 interface (e.g., as denoted in FIG. 9 by the line marked "N9" originating and terminating at UPF/PGW-U 935). Similarly, UPF/PGW-U 935 may receive traffic from UE 901 (e.g., via RAN 910, SMF/PGW-C 920, and/or one or more other devices), and may forward the traffic toward DN 950. In some embodiments, UPF/PGW-U 935 may communicate (e.g., via the N4 interface) with SMF/PGW-C 920, regarding user plane data processed by UPF/PGW-U 935.

UDM/HSS 940 and AUSF 945 may include one or more devices, systems, VNFs, CNFs, etc., that manage, update, and/or store, in one or more memory devices associated with AUSF 945 and/or UDM/HSS 940, profile information associated with a subscriber. AUSF 945 and/or UDM/HSS 940 may perform authentication, authorization, and/or accounting operations associated with the subscriber and/or a communication session with UE 901.

DN 950 may include one or more wired and/or wireless networks. For example, DN 950 may include an Internet Protocol ("IP")-based PDN, a wide area network ("WAN") such as the Internet, a private enterprise network, and/or one or more other networks. UE 901 may communicate, through DN 950, with data servers, other UEs 901, and/or to other servers or applications that are coupled to DN 950. DN 950 may be connected to one or more other networks, such as a public switched telephone network ("PSTN"), a public land mobile network ("PLMN"), and/or another network. DN 950 may be connected to one or more devices, such as content providers, applications, web servers, and/or other devices, with which UE 901 may communicate.

Figure 10:
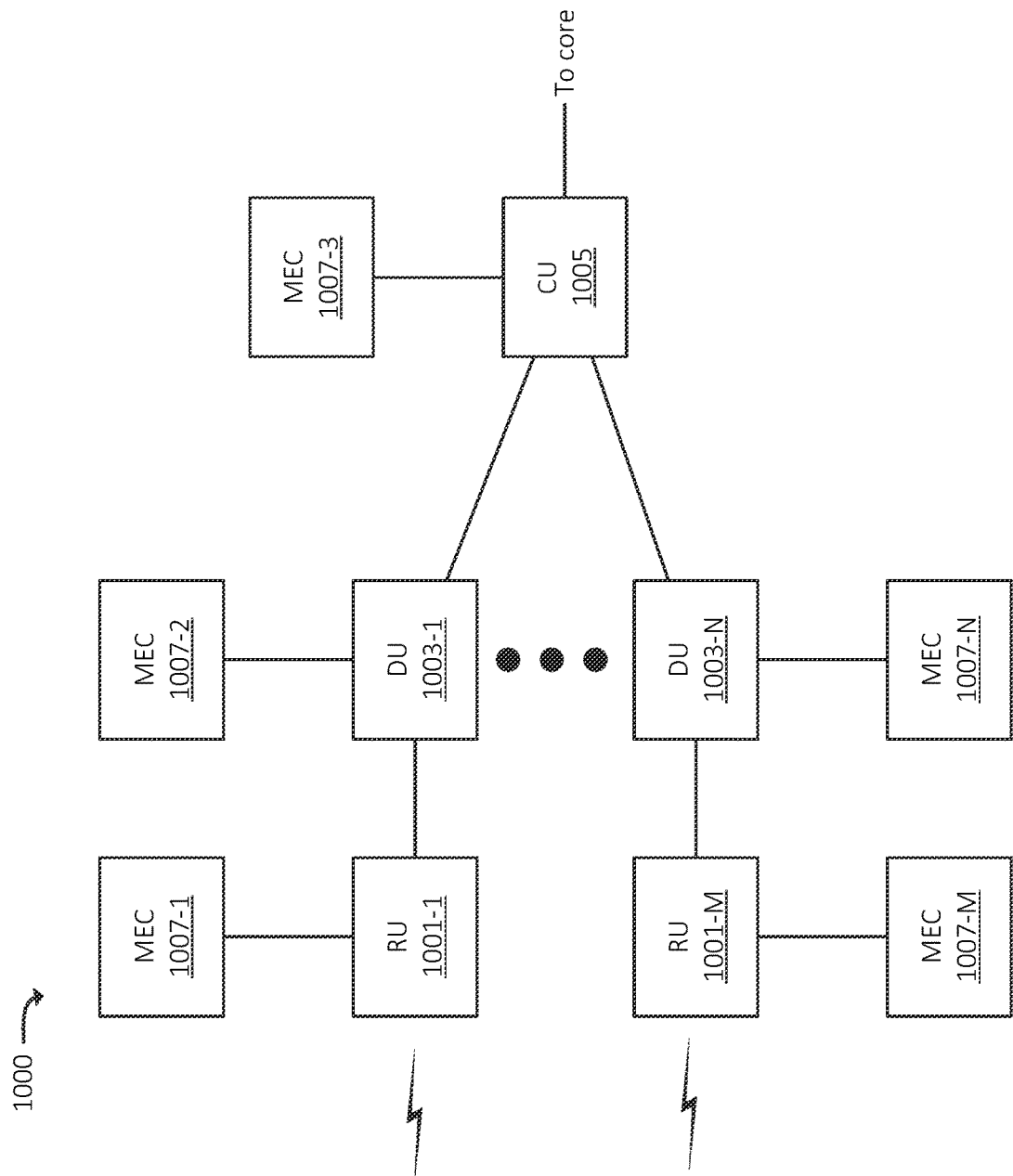
FIG. 10 illustrates an example arrangement of a radio access network ("RAN"), in accordance with some embodiments.

FIG. 10 illustrates an example Distributed Unit ("DU") network 1000, which may be included in and/or implemented by one or more RANs (e.g., RAN 910, RAN 912, or some other RAN). In some embodiments, a particular RAN may include one DU network 1000. In some embodiments, a particular RAN may include multiple DU networks 1000. In some embodiments, DU network 1000 may correspond to a particular gNB 911 of a 5G RAN (e.g., RAN 910). In some embodiments, DU network 1000 may correspond to multiple gNBs 911. In some embodiments, DU network 1000 may correspond to one or more other types of base stations of one or more other types of RANs. As shown, DU network 1000 may include Central Unit ("CU") 1005, one or more Distributed Units ("DUs") 1003-1 through 1003-N (referred to individually as "DU 1003," or collectively as "DUs 1003"), and one or more Radio Units ("RUs") 1001-1 through 1001-M (referred to individually as "RU 1001," or collectively as "RUs 1001").

CU 1005 may communicate with a core of a wireless network (e.g., may communicate with one or more of the devices or systems described above with respect to FIG. 9, such as AMF 915 and/or UPF/PGW-U 935). In the uplink direction (e.g., for traffic from UEs 901 to a core network), CU 1005 may aggregate traffic from DUs 1003, and forward the aggregated traffic to the core network. In some embodiments, CU 1005 may receive traffic according to a given protocol (e.g., Radio Link Control ("RLC")) from DUs 1003, and may perform higher-layer processing (e.g., may aggregate/process RLC packets and generate Packet Data Convergence Protocol ("PDCP") packets based on the RLC packets) on the traffic received from DUs 1003.

In accordance with some embodiments, CU 1005 may receive downlink traffic (e.g., traffic from the core network) for a particular UE 901, and may determine which DU(s) 1003 should receive the downlink traffic. DU 1003 may include one or more devices that transmit traffic between a core network (e.g., via CU 1005) and UE 901 (e.g., via a respective RU 1001). DU 1003 may, for example, receive traffic from RU 1001 at a first layer (e.g., physical ("PHY") layer traffic, or lower PHY layer traffic), and may process/aggregate the traffic to a second layer (e.g., upper PHY and/or RLC). DU 1003 may receive traffic from CU 1005 at the second layer, may process the traffic to the first layer, and provide the processed traffic to a respective RU 1001 for transmission to UE 901.

RU 1001 may include hardware circuitry (e.g., one or more RF transceivers, antennas, radios, and/or other suitable hardware) to communicate wirelessly (e.g., via an RF interface) with one or more UEs 901, one or more other DUs 1003 (e.g., via RUs 1001 associated with DUs 1003), and/or any other suitable type of device. In the uplink direction, RU 1001 may receive traffic from UE 901 and/or another DU 1003 via the RF interface and may provide the traffic to DU 1003. In the downlink direction, RU 1001 may receive traffic from DU 1003, and may provide the traffic to UE 901 and/or another DU 1003.

RUs 1001 may, in some embodiments, be communicatively coupled to one or more MECs 1007. For example, RU 1001-1 may be communicatively coupled to MEC 1007-1, RU 1001-M may be communicatively coupled to MEC 1007-M, DU 1003-1 may be communicatively coupled to MEC 1007-2, DU 1003-N may be communicatively coupled to MEC 1007-N, CU 1005 may be communicatively coupled to MEC 1007-3, and so on. MECs 1007 may include hardware resources (e.g., configurable or provisionable hardware resources) that may be configured to provide services and/or otherwise process traffic to and/or from ULE 901, via a respective RU 1001.

For example, RU 1001-1 may route some traffic, from UE 901, to MEC 1007-1 instead of to a core network (e.g., via DU 1003 and CU 1005). MEC 1007-1 may process the traffic, perform one or more computations based on the received traffic, and may provide traffic to UE 901 via RU 1001-1. In this manner, ultra-low latency services may be provided to UE 901, as traffic does not need to traverse DU 1003, CU 1005, and an intervening backhaul network between DU network 1000 and the core network. In some embodiments, MEC 1007 may include, and/or may implement, some or all of the functionality described above with respect to bridge 301, FPB 401, one or more nodes that implement one or more distributed ledgers 103, UPF 935, and/or one or more other devices, systems, VNFs, CNFs, etc.

Figure 11:
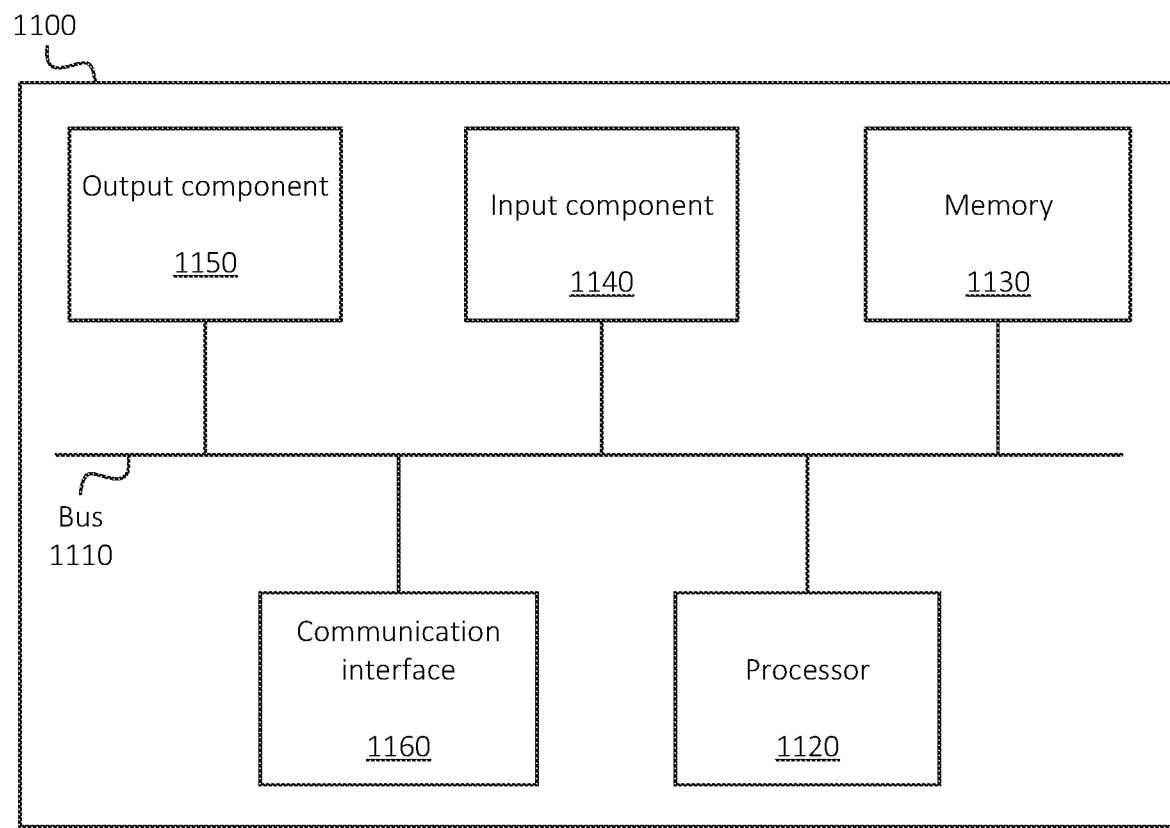
FIG. 11 illustrates example components of one or more devices, in accordance with one or more embodiments described herein.

FIG. 11 illustrates example components of device 1100. One or more of the devices described above may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. In some embodiments, processor 1120 may be or may include one or more hardware processors. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100 and/or other receives or detects input from a source external to 1140, such as a touchpad, a touchscreen, a keyboard, a keypad, a button, a switch, a microphone or other audio input component, etc. In some embodiments, input component 1140 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-8), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
instruct a first set of nodes, that maintain a first distributed ledger, to record first information to the first distributed ledger, wherein the first information includes an indication that an asset is associated with a first owner, wherein the first set of nodes record the first information to the first distributed ledger and associate the first information with a first record on the distributed ledger;
receive a request to bridge the asset from a first distributed ledger that is maintained by the first set of nodes to a second distributed ledger that is maintained by second set of nodes;
based on the request to bridge the asset:
instruct the first set of nodes to record, to the first distributed ledger, second information indicating that the asset is in a frozen state, wherein the first distributed ledger continues to maintain the first information indicating that the frozen asset remains associated with the first owner, wherein the frozen state indicates that the first set of nodes are unable to record information indicating that the asset has been transferred from the first owner to another owner; and
instruct the second set of nodes to record, to the second distributed ledger, a bridged version of the asset, wherein the second set of nodes generate an address, on the second ledger, with which the bridged version of the asset is associated;
perform a linking operation between the asset and the bridged version of the asset, wherein performing the linking operation includes performing at least one of:
instructing the first set of notes to record, to the first distributed ledger, first linking information that associates the asset to the bridged version of the asset, the first linking information including the a address, associated with the second distributed ledger, with which the bridged version of the asset is associated, or
instructing the second set of nodes to record, to the second distributed ledger, second linking information that associates the bridged version of the asset to the asset, the second linking information including an address, associated with the first distributed ledger, with which the asset is associated;
identify a first record, recorded to the first distributed ledger, that indicates a particular set of operations to perform based on the asset being associated with the first owner;
instruct, after the first set of nodes have recorded the information to the first ledger indicating that the asset is in the frozen state, the first set of nodes to perform the particular set of operations indicated in the first record, with respect to the asset, based on the asset being associated with the first owner;
monitor the second distributed ledger after performing the linking operation between the asset and the bridged version of the asset;
identify, based on the monitoring, that a second record has been recorded to the second distributed ledger, indicating a transfer of the bridged version of the asset to a second owner; and
based on identifying the second record, recorded to the second distributed ledger, indicating the transfer of the bridged version of the asset:
identify, based on the first linking information recorded to the first distributed ledger or the second linking information recorded to the second distributed ledger, the address, on the first distributed ledger, with which the asset is associated;
record, to the first distributed ledger, further based on identifying the address with which the asset is associated based on the first linking information or the second linking information, information disassociating the first owner from the asset; and cease instructing the first set of nodes to perform the particular set of operations with respect to the asset, based on the information recorded to the first distributed ledger that the asset has been disassociated from the first owner.

2. The device of claim 1, wherein the one or more operations include recording further information to the first distributed ledger associating one or more other assets with the first owner.

3. The device of claim 1, wherein the asset includes an Ethereum Request for Comments 721 asset.

4. The device of claim 1, wherein recording the information disassociating the first owner from the asset includes performing a burn operation with respect to the asset, wherein the burn operation includes recording information to the first distributed ledger that the asset has been burned.

5. A non-transitory computer-readable medium, storing a plurality of processor-executable instructions to:

instruct a first set of nodes, that maintain a first distributed ledger, to record first information to the first distributed ledger, wherein the first information includes an indication that an asset is associated with a first owner, wherein the first set of nodes record the first information to the first distributed ledger and associate the first information with a first record on the distributed ledger;

receive a request to bridge the asset from a first distributed ledger that is maintained by the first set of nodes to a second distributed ledger that is maintained by a second set of nodes;

based on the request to bridge the asset:

instruct the first set of nodes to record, to the first distributed ledger, second information indicating that the asset is in a frozen state, wherein the first distributed ledger continues to maintain the first information indicating that the frozen asset remains associated with the first owner, wherein the frozen state indicates that the first set of nodes are unable to record information indicating that the asset has been transferred from the first owner to another owner; and instruct the second set of nodes to record, to the second distributed ledger, a bridged version of the asset, wherein the second set of nodes generate an address, on the second ledger, with which the bridged version of the asset is associated;

perform a linking operation between the asset and the bridged version of the asset, wherein performing the linking operation includes performing at least one of:

instructing the first set of notes to record, to the first distributed ledger, first linking information that associates the asset to the bridged version of the asset, the first linking information including the address, associated with the second distributed ledger, with which the bridged version of the asset is associated, or instructing the second set of nodes to record, to the second distributed ledger, second linking information that associates the bridged version of the asset to the asset, the second linking information including an address, associated with the first distributed ledger, with which the asset is associated;

identify a first record, recorded to the first distributed ledger, that indicates a particular set of operations to perform based on the asset being associated with the first owner;

instruct, after the first set of nodes have recorded the information to the first ledger indicating that the asset is in the frozen state, the first set of nodes to perform the particular set of operations indicated in the first record, with respect to the asset, based on the asset being associated with the first owner;

monitor the second distributed ledger after performing the linking operation between the asset and the bridged version of the asset;

identify, based on the monitoring, that a second record, has been recorded to the second distributed ledger, indicating a transfer of the bridged version of the asset to a second owner; and based on identifying the second record, recorded to the second distributed ledger, indicating the transfer of the bridged version of the asset:

identify, based on the first linking information recorded to the first distributed ledger or the second linking information recorded to the second distributed ledger, the address, on the first distributed ledger, with which the asset is associated;

record, to the first distributed ledger, further based on identifying the address with which the asset is associated based on the first linking information or the second linking information, information disassociating the first owner from the asset; and cease instructing the first set of nodes to perform the particular set of operations with respect to the asset, based on the information recorded to the first distributed ledger that the asset has been disassociated from the first owner.

6. The non-transitory computer-readable medium of claim 5, wherein the one or more operations include recording further information to the first distributed ledger associating one or more other assets with the first owner.

7. The non-transitory computer-readable medium of claim 5, wherein the asset includes an Ethereum Request for Comments 721 asset.

8. The non-transitory computer-readable medium of claim 5, wherein recording the information disassociating the first owner from the asset includes performing a burn operation with respect to the asset, wherein the burn operation includes recording information to the first distributed ledger that the asset has been burned.

9. A method, comprising:

instructing a first set of nodes, that maintains a first distributed ledger, to record first information to the first distributed ledger, wherein the first information includes an indication that an asset is associated with a first owner, wherein the first set of nodes record the first information to the first distributed ledger and associate the first information with a first record on the distributed ledger;

receiving a request to bridge the asset from a first distributed ledger that is maintained by the first set of nodes to a second distributed ledger that is maintained by a second set of nodes;

based on the request to bridge the asset:

instructing the first set of nodes to record, to the first distributed ledger, second information indicating that the asset is in a frozen state, wherein the first distributed ledger continues to maintain the first information indicating that the frozen asset remains associated with the first owner, wherein the frozen state indicates that the first set of nodes are unable to record information indicating that the asset has been transferred from the first owner to another owner; and instructing the second set of nodes to record, to the second distributed ledger, a bridged version of the asset, wherein the second set of nodes generate an address, on the second ledger, with which the bridged version of the asset is associated;

performing a linking operation between the asset and the bridged version of the asset, wherein performing the linking operation includes performing at least one of:

instructing the first set of notes to record, to the first distributed ledger, first linking information that associates the asset to the bridged version of the asset, the first linking information including the address, associated with the second distributed ledger, with which the bridged version of the asset is associated, or instructing the second set of nodes to record, to the second distributed ledger, second linking information that associates the bridged version of the asset to the asset, the second linking information including an address, associated with the first distributed ledger, with which the asset is associated;

identifying a first record, recorded to the first distributed ledger, that indicates a particular set of operations to perform based on the asset being associated with the first owner;

instructing, after the first set of nodes have recorded the information to the first ledger indicating that the asset is in the frozen state, the first set of nodes to perform the particular set of operations indicated in the first record, with respect to the asset, based on the asset being associated with the first owner;

monitoring the second distributed ledger after performing the linking operation between the asset and the bridged version of the asset;

identifying, based on the monitoring, that a second record has been recorded to the second distributed ledger, indicating a transfer of the bridged version of the asset to a second owner; and based on identifying the second record, recorded to the second distributed ledger, indicating the transfer of the bridged version of the asset:

identifying, based on of the first linking information recorded to the first distributed ledger or the second linking information recorded to the second distributed ledger, the address, on the first distributed ledger, with which the asset is associated;

recording, to the first distributed ledger, further based on identifying the address with which the asset is associated based on the first linking information or the second linking information, information disassociating the first owner from the asset; and ceasing to instruct the first set of nodes to perform the particular set of operations with respect to the asset, based on the information recorded to the first distributed ledger that the asset has been disassociated from the first owner.

10. The method of claim 9, wherein the asset includes an Ethereum Request for Comments 721 asset.

11. The method of claim 9, wherein recording the information disassociating the first owner from the asset includes performing a burn operation with respect to the asset, wherein the burn operation includes recording information to the first distributed ledger that the asset has been burned.

12. The method of claim 9, wherein the address, associated with the first distributed ledger, with which the asset is associated, is a first address of the first distributed ledger, wherein the address, associated with the second distributed ledger, with which the bridged version of the asset is associated, is a second address of the second distributed ledger, wherein the first owner is associated with a third address of the first distributed ledger, and wherein the second owner is associated with a fourth address of the second distributed ledger.

13. The device of claim 1, wherein the address, associated with the first distributed ledger, with which the asset is associated, is a first address of the first distributed ledger, wherein the address, associated with the second distributed ledger, with which the bridged version of the asset is associated, is a second address of the second distributed ledger, wherein the first owner is associated with a third address of the first distributed ledger, and wherein the second owner is associated with a fourth address of the second distributed ledger.

14. The non-transitory computer-readable medium of claim 5, wherein the address, associated with the first distributed ledger, with which the asset is associated, is a first address of the first distributed ledger, wherein the address, associated with the second distributed ledger, with which the bridged version of the asset is associated, is a second address of the second distributed ledger, wherein the first owner is associated with a third address of the first distributed ledger, and wherein the second owner is associated with a fourth address of the second distributed ledger.

* * * * *